(No Model.) 3 Sheets—Sheet 2.
J. H. PITKIN & J. F. STEWARD.
SELF BINDING HARVESTER.
No. 389,939. Patented Sept. 25, 1888.
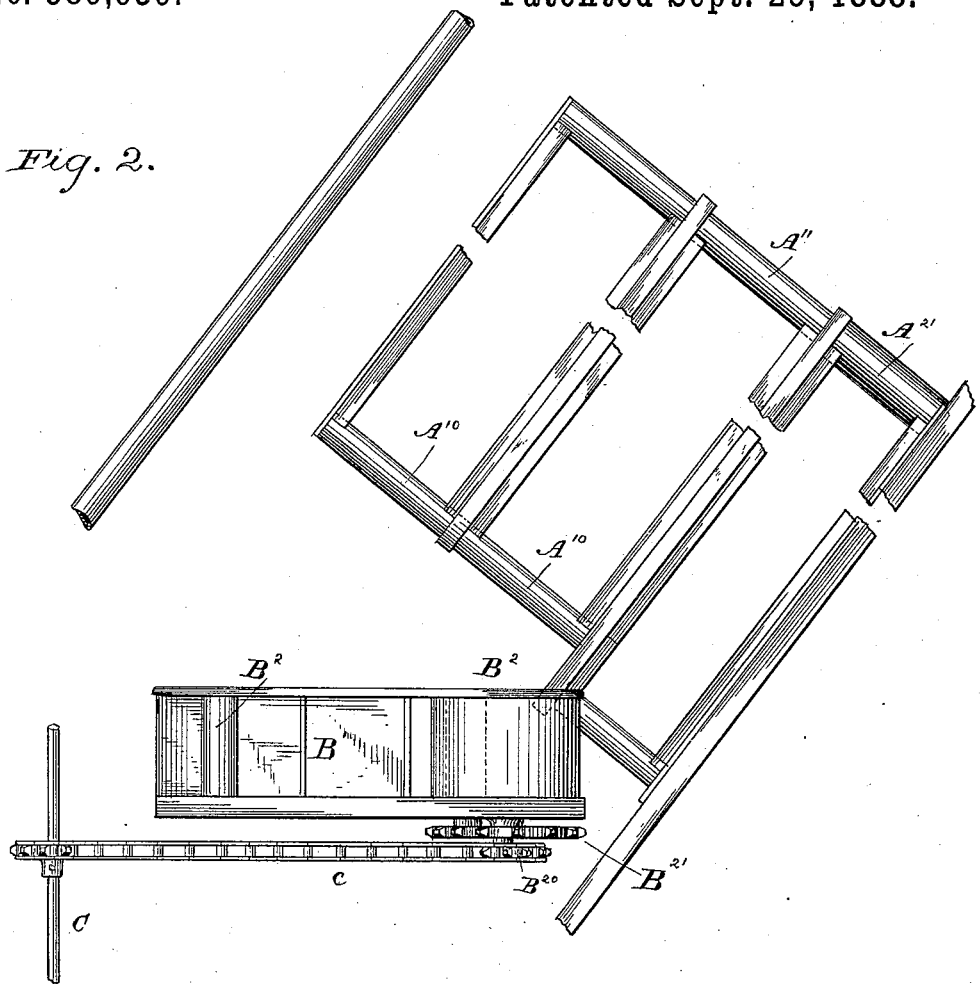
Fig. 2.
Fig. 3.
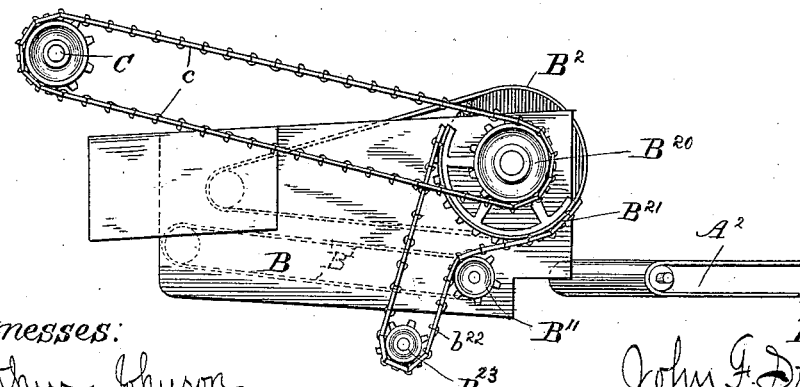

(No Model.) 3 Sheets—Sheet 3.

J. H. PITKIN & J. F. STEWARD.
SELF BINDING HARVESTER.

No. 389,939. Patented Sept. 25, 1888.

Witnesses.
Arthur Johnson
John R. Bettenstrom

Inventors.
John F. Steward
Julian H. Pitkin
By Burton and Burton
their attys

UNITED STATES PATENT OFFICE.

JULIAN H. PITKIN AND JOHN F. STEWARD, OF CHICAGO, ILLINOIS.

SELF-BINDING HARVESTER.

SPECIFICATION forming part of Letters Patent No. 389,939, dated September 25, 1888.

Application filed October 12, 1887. Serial No. 252,180. (No model.)

*To all whom it may concern:*

Be it known that we, JULIAN H. PITKIN and JOHN F. STEWARD, citizens of the United States, residing at Chicago, in the county of Cook and State of Illinois, have invented certain new and useful Improvements in Self-Binding Harvesters, which are described fully in the following specification, reference being had to the accompanying drawings, forming part thereof, wherein—

Figure 1:
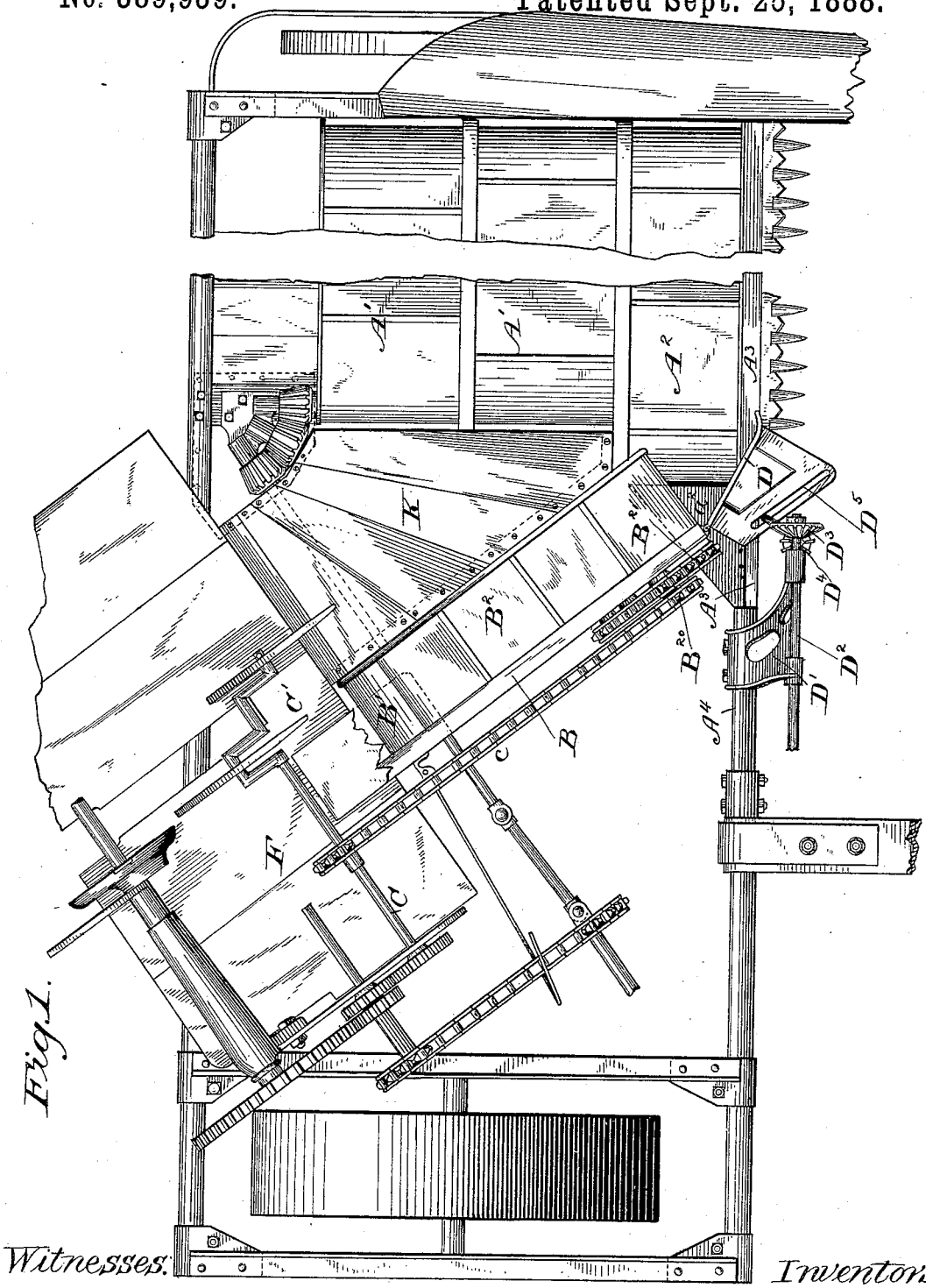
Figures 4, 5:
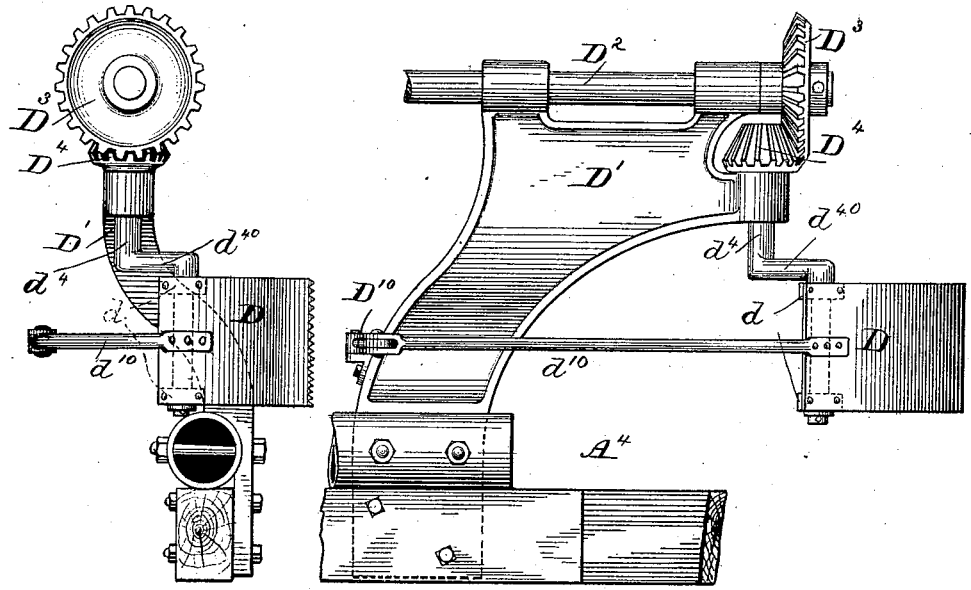
Figure 6:
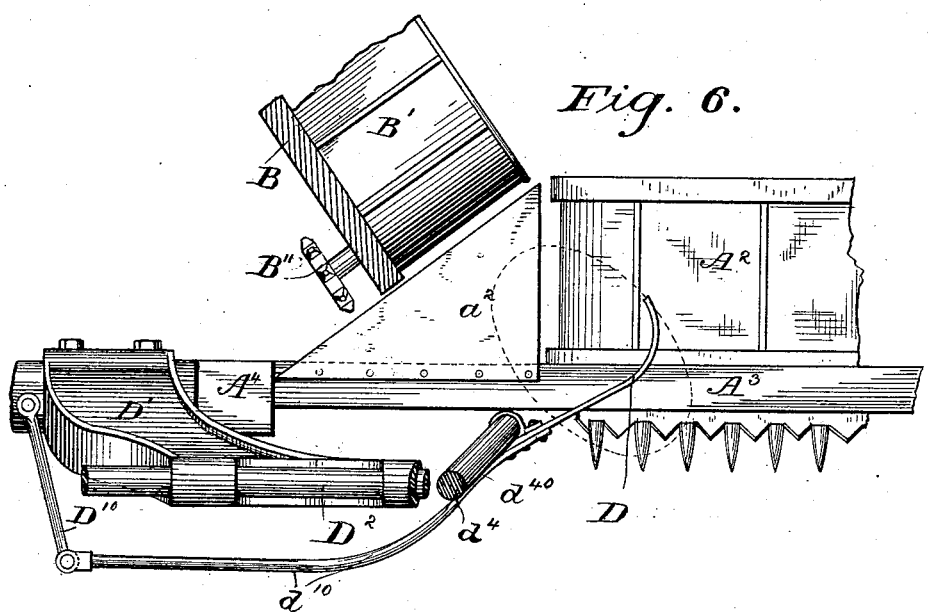

Figure 1 is a plan of a harvester containing our improvements, details not relating thereto being omitted or only partially shown. Fig. 2 is a plan of the platform-conveyer and certain butt-deflecting conveyers relating to our invention, the platform-conveyer and the upper one of the butt-deflecting conveyers being stripped of their carrying-belts, and the driving mechanism of the platform conveyer being also omitted. Fig. 3 is a front elevation of the driving mechanism of the butt-deflecting conveyers, portions of the supporting-frame and of the forward carrier of the platform-conveyer being also shown. Fig. 4 is a front elevation of the butt evening and deflecting paddle and its operating mechanism, a piece also of the front sill to which it is secured being shown. Fig. 5 is a grain side elevation of the same parts shown in Fig. 4. Fig. 6 is a plan of the same, part of the driving-gearing being broken away and the whole being shown in relation to the finger-bar, platform-conveyer, and lower butt-deflecting conveyer, parts of which appear in the view.

The platform-conveyer comprises the two shorter endless-belt carriers, A' A', and the longer one, A². The driving-power is communicated to the shaft of the driving-roller A¹⁰ of the shorter carriers, A' A', said driving-roller being at the discharge side, and the longer carrier, A², is driven by the roller A²¹ at the grain side, said roller being fast on the shaft of the corresponding roller, A¹¹, of the carriers A' A'. In order to give the longer carrier a slightly greater speed than the others, so that it may counteract the tendency of the butts to lag behind, the roller A²¹ is made a little larger than the roller A¹¹.

The extra length of the forward carrier, A², is at the discharge side, and its roller at that side is located some distance stubbleward from the heel of the sickle.

At the discharge side of the platform-conveyer there are located the two butt-deflecting conveyers B' and B², the former underneath and the latter above the grain, both operating in a vertical plane oblique to that of the platform-conveyer. The lower of these butt-deflecting conveyers has its receiving side substantially at the level of the discharge side of the platform-carrier A² and extends near enough to said platform-carrier so that it may receive the grain therefrom. The upper of the butt-deflecting conveyers, B², extends grainward a greater distance than the lower one and overhangs the discharge side of the forward platform-carrier, A². Power is communicated to the butt-deflecting conveyers from the packer-shaft C by means of the driving-chain c, which passes over a small sprocket-wheel, B²⁰, on the shaft of the upper butt-conveyer, B², on which shaft there is also fixed the larger sprocket-wheel, B²¹, around which passes the chain b²², which passes also around the tightener B²³ and over the sprocket-wheel B¹¹ on the shaft of the driving-roller of the lower butt-deflecting conveyer, B'. All these sprocket-wheels and the chain c are guarded from entanglement with the straw by the front board or head-board, B, of the frame, in which both the said butt-deflecting conveyers have their shaft-bearings. The triangular space between the discharge side of the platform-carrier A² and the receiving side of under butt-deflecting conveyer, B', is occupied by the triangular platform $a^2$, which is supported by the finger-bar A³.

The triangular space between the discharge side of the platform-carriers A' A' and the receiving side of the binder-deck F, and which is further bounded by the lower butt-deflecting conveyer, B', is occupied by a fixed decking, K, which joins the receiving edge of the binder-deck F and extends close to the discharge side of the carriers A'. This decking supports the heads of the grain, as in the usual construction of low-down harvesters, during its passage from the platform-conveyer to the binder.

In order to clear the heel of the sickle and carry the butts of the grain positively off the carrier A² and over onto the triangular platform $a^2$ and leave them in reach of the upper butt-deflecting conveyer, B², we provide the butt-deflecting paddle or oar D, and to actuate it the following mechanism: To the front sill, A⁴, is secured the bracket D', in the upper end of which is journaled the horizontal shaft D², extending grainward, and carrying at its grain end the beveled gear-wheel D³, which drives the gear-wheel D⁴, which is fixed on the upper end of the vertical shaft d⁴, which is also journaled in the bracket D'. The shaft d⁴ is cranked below its bearing in the bracket, and upon the crank-wrist d⁴⁰ is pivoted the paddle D, which is provided with suitable bracket-ears, d d, for that purpose. Said paddle has also the arm d¹⁰ projecting from it, and connected by the link D¹⁰ to the bracket D'. The form of the paddle is shown in the detail plan, Fig. 6. It is concave rearward, (though not necessarily curvilinear in outline,) forming a lip at its grainward edge to engage the grain, and has its grainward edge serrated or toothed. The path of its movement is as outlined by the dotted lines in Fig. 6, said path being the resultant from the rotation of the crank and the guidance of the link D¹⁰. It will be noticed that its said movement is such that its serrated edge enters the grain while it is still standing and gathers it toward the sickle, and when it falls still engages the butts and carries them rearward and stubbleward. The peculiarity of its action consists in the fact that its grain end, being curved or bent rearward and being moved in a curve grainward forward of the vertical plane of the sickle, and then rearward across the sickle, and then stubbleward, it reaches around the forward ends of the butts and engages them on the grainward side at the same time that it engages them directly at the ends, and so positively draws them stubbleward off the platform-conveyer at the same time that it positively pushes them rearward to clear the heel of the sickle.

The triangular platform a², on which the butts of the grain are thus lodged, is overhung by the upper butt-deflecting conveyer, B², which thus has opportunity to obtain good grasp upon them and move them in the direction of its own motion—viz., obliquely rearward—and bring them into the grasp of the lower butt-deflecting conveyer, B'. Meanwhile it will be noticed that the body and heads of the grain, if it is clear of the platform-conveyer carriers A' A', lie on the deck K, which occupies the space stubbleward from the shorter carriers, A' A', rearward of the projecting portion of the longer carrier, A², and behind the butt-deflecting conveyers B' B²; and since butts of the grain, if it lies straight on the platform-conveyer, will still rest on the forward carrier, A², when the body and heads reach the discharge side of the shorter carriers, A' A', it cannot at that juncture drop into the aperture between the discharge side of said shorter carriers and the deck K, and if it lies obliquely in either direction it will be carried crosswise of that aperture and will not fall through and choke the carriers; and in any event, whether the grain fall on the platform-conveyer straight or oblique in either direction, all actuation of the heads and middle will cease and the grain be supported at the heads by said deck K, while the butts are carried onward, first by the longer carrier, A², and next by the overhanging end of the upper butt-deflecting conveyer, B², and by the butt-deflecting paddle D, and, finally, by both the butt-deflecting conveyers B' and B², acting in conjunction and grasping the butts between them. The grain is thus turned to a position parallel with the shafts of the butt-deflecting conveyers, and in that position is engaged by the packers C' C', which operate in planes parallel to the vertical plane of movement of said butt-deflecting conveyers.

In Fig. 1 there is shown a modified form of the butt-deflecting paddle D, the paddle being hinged to the frame of the conveyers B' and B² and actuated directly by the crank of the shaft d⁴, which engages in the slotted rib D⁵, secured to the forward side of the paddle D.

We claim—

1. In combination, substantially as set forth, the platform-conveyer comprising endless carriers located behind the sickle and operating stubbleward in a direction parallel thereto, butt-deflecting conveyers consisting of two endless belts and their rollers, said belts located one above the other, each operating in a vertical plane oblique to those of the platform-carriers, the foremost platform-carrier being extended stubbleward farther than the rear carriers, and the receiving side of the upper butt-deflecting conveyer overhanging such extended portion of the foremost carrier.

2. In combination, substantially as set forth, the platform-conveyer comprising endless carriers located behind the sickle and operating stubbleward in direction parallel thereto, and the lower butt-deflecting conveyer, the receiving side of the latter being substantially at the same level as the discharge side of the foremost platform-carrier and having the vertical plane of its movement oblique to those of the platform-carriers, the triangular platform a² occupying the space between the discharge side of the forward platform-carrier and the receiving side of the lower butt-deflecting conveyer, and the upper butt-deflecting conveyer having its receiving side overhanging the said triangular platform and overhanging the discharge side of the foremost platform-carrier.

3. In combination with the sickle and the platform-conveyer comprising an endless carrier in the rear of the sickle and operating stubbleward parallel thereto, the butt-deflecting conveyers operating in a vertical plane oblique to the platform-carrier and having their receiving sides farther stubbleward than the heel of the sickle, the paddle D, and the mechanism which operates it, substantially as described, to give its grainward end a curved path, said paddle being located, as shown, so that said path crosses the vertical plane of the sickle grainward from the stubble end of the cut and crosses the vertical plane of the discharge side of the platform-conveyer and extends stubbleward toward the receiving side of the butt-deflecting conveyer, substantially as set forth.

4. In combination with the sickle and the platform-conveyer comprising an endless carrier located in the rear of the sickle and operating stubbleward parallel thereto, the lower butt-deflecting conveyer having its receiving side substantially at the level of the discharge side of the platform-conveyer and at an oblique angle thereto, the triangular platform located in said oblique angle and the butt-actuating paddle and the mechanism, substantially as described, which actuates it, said paddle being located as shown, whereby its path is rearward across the sickle, thence stubbleward from a point above the platform-conveyer to a point above said triangular platform, substantially as set forth.

JULIAN H. PITKIN.
JOHN F. STEWARD.

Witnesses:
JOHN B. KASPARI,
T. B. REED.